R. McKINLEY.
Rotary Cultivators.
No. 139,013.  Patented May 20, 1873.
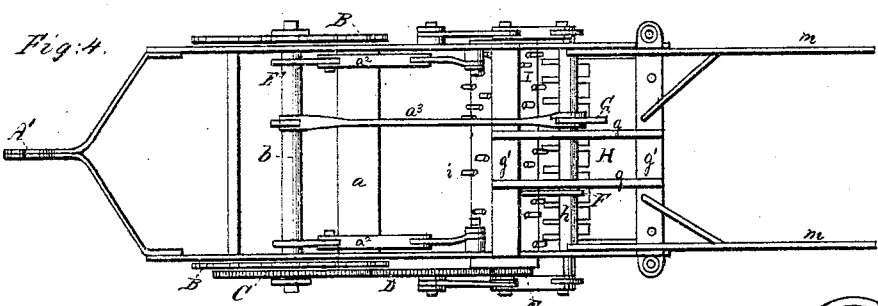
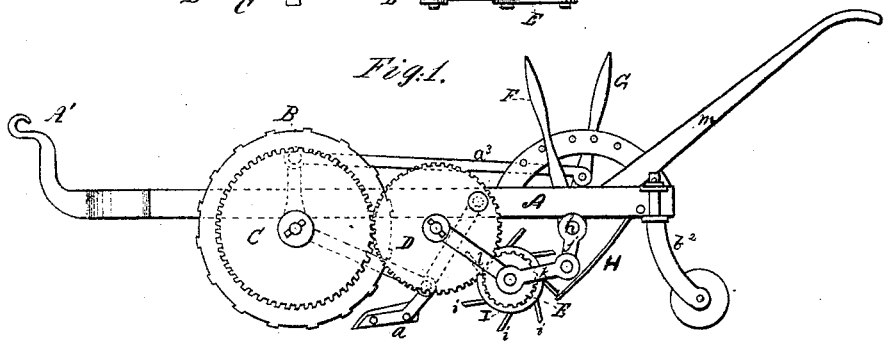
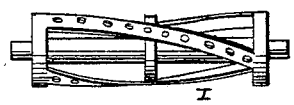
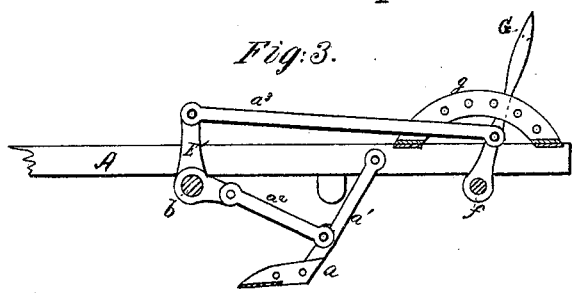

UNITED STATES PATENT OFFICE.

ROBERT McKINLEY, OF HYDE PARK, NEW YORK.

IMPROVEMENT IN ROTARY CULTIVATORS.

Specification forming part of Letters Patent No. 139,013, dated May 20, 1873; application filed February 17, 1873.

*To all whom it may concern:*

Be it known that I, ROBERT MCKINLEY, of Hyde Park, Dutchess county and State of New York, have invented certain Improvements in Combined Hoe, Path-Cutter, and Raker, of which the following is a specification:

This invention relates to a combined hoe, path-cutter, and rake, and is intended for application in making roads and paths and in beautifying lawns, and for any other similar purposes.

Description.

Figure 1 is a side view of my invention; Fig. 2, a view of the rake-cylinder detached. Fig. 3 is a longitudinal section of a part of the machine showing the hoe or cutter and its adjusting mechanism; and Fig. 4 is a top view.

A is the frame of the machine held together by suitable cross-braces and provided with handles $m$ and supported by wheels B on the shaft $b$ and caster-wheels on legs $b^2$ at the back of the machine. One of the wheels B has secured to it a pinion, $c$, which, as the wheel turns in the act of being moved over the ground, engages the pinion D, which moves pinion E on the end of the raking-roller I provided with teeth $i$. The roller I is carried on a shaft supported at the adjacent ends of the links $l\ k$, the former being connected at the axis of pinion D and the latter to the end of an arm, $j$, projecting from a rock-shaft, $h$, to which is attached an arm or lever, F. By turning this lever F the position of the rake-roller may be changed to have more or less action on the soil cut and loosened by the hoe or cutter $a$, and in all positions the pinion F is always retained in operative contact with pinion D. The hoe $a$ is carried at the end of pivoted arms $a^1$, and by links $a^2$ is connected to arms of the rock-shaft $b$. An arm projecting from this rock-shaft is, by link $a^3$, connected with lever or arm G, by moving which and the rock-shaft, the hoe or cutter may be raised or lowered to bring it in position to disturb the earth to the proper depth. These levers F G are provided with pins to engage holes in plate $g$, so that the levers may be secured in the desired positions.

The machine may be drawn or moved over the ground in any desired manner. The hoe being lowered to the desired position, cuts and breaks up the soil, and the teeth of the roller or rake pulverize and distribute the soil evenly. By placing the teeth $i$ helically, the stones, &c., may be carried to one side.

Claim.

The hoe $a$, and its rock-shaft and links, in combination with the rotating rake I, as and for the purpose set forth.

ROBERT McKINLEY.

Witnesses:
JOHN HACKETT,
GEO. BENSON.